United States Patent [19]

Chang et al.

[11] Patent Number: 5,236,678
[45] Date of Patent: Aug. 17, 1993

[54] PROCESS FOR ABSORPTION OF SULFUR COMPOUNDS FROM FLUIDS USING PIPERIDINES

[75] Inventors: Dane Chang, Houston; Steven H. Christiansen, Richwood, both of Tex.

[73] Assignee: The Dow Chemical Company, Midland, Mich.

[21] Appl. No.: 702,795

[22] Filed: May 17, 1991

Related U.S. Application Data

[63] Continuation-in-part of Ser. No. 569,117, Aug. 16, 1990, abandoned.

[51] Int. Cl.$^5$ .............................. B01D 53/34
[52] U.S. Cl. ..................... 95/166; 423/242.7; 423/242.6; 210/634; 95/235
[58] Field of Search ............... 55/73; 423/243, 242.6, 423/242.7, 242.3, 242.4; 210/634

[56] References Cited

U.S. PATENT DOCUMENTS

| | | | |
|---|---|---|---|
| 2,490,840 | 12/1949 | Shaw | 423/243 |
| 3,620,674 | 11/1971 | Renault et al. | 423/243 |
| 3,637,345 | 1/1972 | Leder | 423/243 |
| 3,793,434 | 2/1974 | Leder | 423/223 |
| 3,856,921 | 12/1974 | Shrier et al. | 423/228 |
| 3,873,673 | 3/1975 | Teague et al. | 423/512 R |
| 4,080,424 | 3/1978 | Miller et al. | 423/226 |
| 4,094,957 | 6/1978 | Sartori et al. | 423/229 |
| 4,100,256 | 7/1978 | Bozzelli et al. | 423/220 |
| 4,107,270 | 8/1978 | Ferrin et al. | 423/226 |
| 4,112,049 | 9/1978 | Bozzelli et al. | 423/226 |
| 4,217,238 | 8/1980 | Sartori et al. | 423/226 |
| 4,345,918 | 8/1982 | Meissner | 55/73 |
| 4,366,134 | 12/1982 | Korosy et al. | 423/243 |
| 4,465,614 | 8/1984 | Trentham et al. | 423/243 |
| 4,469,663 | 9/1984 | Crump et al. | 423/242 |
| 4,484,934 | 11/1984 | Ferrin et al. | 55/73 |
| 4,530,704 | 7/1985 | Jones et al. | 55/48 |
| 4,767,860 | 8/1988 | Dunmore et al. | 544/384 |
| 4,783,327 | 11/1988 | Treybig et al. | 423/243 |
| 4,814,443 | 3/1989 | Treybig et al. | 540/492 |

FOREIGN PATENT DOCUMENTS 2108282 8/1972 Fed. Rep. of Germany ...... 323/575
450519 7/1936 United Kingdom .

OTHER PUBLICATIONS

"Handbook of Chemistry and Physics", R. C. Weast, ed., 54th Ed. CRC Press: Cleveland (1973), p. D-127.
CA 50:15594f (1956).
CA 52:12776 (1958).
CA 10:2801–2802 (1916).
CA 50:15426A–15428 (1956).
Jones and Lindsey, Studies of Coal Tar Bases, *J. Chem. Soc.*, pp. 3261–3264 (1952).
Kirk-Othmer, Encyclopedia of Chemical Technology, Cyanoethylation, vol. 7, p. 374.
W. V. Drake et al., The Reaction of Organic Halides with Piperidine. IV. Bromo Esters, *J. Am. Chem. Soc.*, vol. 56, pp. 697–700 (1934).
(List continued on next page.)

*Primary Examiner*—Michael Lewis
*Assistant Examiner*—Peter T. DiMauro

[57] ABSTRACT

Sulfur dioxide is removed from a fluid containing $SO_2$ by employing as an absorbent for the $SO_2$ an aqueous solution of a compound represented by Formula I:

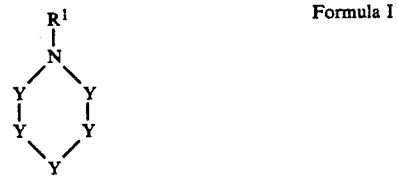

Formula I wherein each Y is independently $-(CR^2_2)-$ or $-(CR^2)=$ and each $R^1$ or $R^2$ is independently hydrogen, an alkyl group; an hydroxyalkyl group: an aldehyde group: a carboxylic acid group or salt thereof: an alkyl group containing at least one carboxylic ester, a carboxylic acid or salt thereof, ether, aldehyde, ketone, or sulfoxide group: wherein the compound has at least one carbonyl group. The absorbent solution preferably can be thermally regenerated by heating to remove $SO_2$.

30 Claims, No Drawings

OTHER PUBLICATIONS

Heinz W. Sternber et al., The Chemistry of Metal Carbonyls. III. The Reaction between Dicobalt Octacarbonyl and Dimethylamine. J. Am. Chem. Soc., vol. 75, pp. 3148–3152 (1952).

Harold Shecter et al., Reaction of Unsymmetrical Cycloalkanones and Hydrazoic Acid; Synthesis of d,1-Lysine, J. Am. Chem. Soc., vol. 73, pp. 3087–3091, (1951).

E. C. Horning et al., Beckmann Rearrangements. A New Method, J. Am. Chem. Soc., vol. 74, pp. 2680–2681 (1952).

Raymond I. Longley, Jr. et al., Some Reactions of 2-Alkoxy-3,4-dihydro-2H-pyrans, J. Am. Chem. Soc., vol. 74, pp. 2012–2015, (1952).

W. Theilheimer, Synthetic Methods of Organic Chemistry, vol. 13, p. 224, (1959).

Chem. Abstr. 48:2650f (1955).
Chem. Abstr. 50:10678d (1956).
Chem. Abstr. 50:1896b (1956).
Chem. Abstr. 48:12810g (1955).
Chem. Abstr. 44:5103g (1950).
Chem. Abstr. 48:1430h (1955).
Chem. Abstr. 49:7603g (1955).
Chem. Abstr. 52:13804i–13805 (1958).
Chem. Abstr. 50:15594f (1956).
Chem. Abstr. 52:1277b (1958).

K. Hess et al., Methylation of cyclic amino acids. II. Synthesis of I-methylhexahydropicolinic and I-methylhexahydronicotinic acids, Ber. 50, 385–389 (1917). Chem. Abstr. 10: pp. 2801–2802.

Wilhelm Treibs et al., Syntheses with dicarboxylic acids. XVI. 2-Oximido-and 2,2'-dioximido dicarboxylic esters and their reduction, Chem. Ber. 89, 51–57 (1956). Chem. Abstr. 50: 15426a–15428, (1956).

U.S. application Ser. No. 546,075 filed Jun. 29, 1990.
U.S. application Ser. No. 07/418,292, filed Oct. 6, 1989.
U.S. application Ser. No. 07/569,120, filed Aug. 16, 1990.
U.S. application Ser. No. 07/569,091, filed Aug. 16, 1990.
U.S. application Ser. No. 07/569,118, filed Aug. 16, 1990.
Search Report dated Feb. 27, 1992 for EP 91 30 7607.

PROCESS FOR ABSORPTION OF SULFUR COMPOUNDS FROM FLUIDS USING PIPERIDINES

This application is a continuation-in-part of application Ser. No. 07/569,117 filed Aug. 16, 1990 now abandoned.

BACKGROUND OF THE INVENTION

This invention relates to a method for removing sulfur compounds from gaseous streams. More particularly, it relates to a method for removing sulfur compounds including sulfur dioxide ($SO_2$) from fluids.

Removal of such sulfur compounds as sulfur dioxide, e.g. from fluids such as industrial and utility gas emissions, is increasingly important. Acid rain is believed to occur when sulfur dioxide in such emissions undergoes chemical changes in the atmosphere and returns to earth with precipitation.

There are numerous techniques for removing sulfur compounds from gas streams containing them. One common process employs limestone scrubbing. The disadvantage of this process is the necessity of disposing of the large volume of solid waste produced. The wastes are not generally recycled. Another system, taught in U.S. Pat. No. 4,366,134, employs potassium or sodium citrate to selectively remove $SO_2$ from a gas stream. While the wastes from this process can be recycled, recycle is expensive because thermally stable salts are formed and require higher heat for regeneration.

More recent patents teach the use of certain piperazinone derivatives. For instance, U.S. Pat. No. 4,112,049 teaches use of certain piperazinones and N,N'-alkyl piperazinone. In another patent, U.S. Pat. No. 4,530,704, the removal of $SO_2$ from a gas stream is accomplished by contacting a gas stream containing it with an aqueous solution of a piperazinone, morpholinone or N-alkyl substituted derivatives thereof, e.g. N,N'-dimethyl-2-piperazinone. In U.S. Pat. No. 4,783,327 certain hydroxyalkyl substituted piperazinones are taught for use in a similar manner.

It would be advantageous to have a process for removal of sulfur compounds such as sulfur dioxide which employs an aqueous solution and uses an absorbent which has a high capacity for absorbing sulfur dioxide. The absorbent would desirably be regenerable. It is also desirable that this absorbent has adequate water compatibility at ambient or higher temperatures and its salts are water soluble to avoid inducing scaling or plugging of plant equipment.

SUMMARY OF THE INVENTION

The present invention is a process for removing $SO_2$ from a fluid containing $SO_2$ by employing, as an absorbent for $SO_2$, an aqueous solution of at least one compound represented by Formula I.

DETAILED DESCRIPTION OF THE INVENTION

The compounds useful as absorbents for removing $SO_2$ from fluids are piperidines having carbonyl groups, preferably compounds of Formula I:

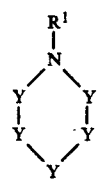

Formula I wherein each Y is independently $-(CR^2_2)-$ or $-(CR^2)=$ and each $R^1$ or $R^2$ is independently hydrogen, an alkyl group: an hydroxyalkyl group: an aldehyde group: a carboxylic acid group or salt thereof: an alkyl group containing at least one carboxylic ester, a carboxylic acid or salt thereof, ether, aldehyde, ketone, or sulfoxide group: wherein the compound has at least one carbonyl group (a carbonyl-containing group), that is, at least one $R^1$ or $R^2$ comprises $-(C=O)-$ e.g. as in an aldehyde-, ester-, carboxylic acid- (or salt), or ketone-containing group. The carbonyl group(s) are, thus, exocyclic.

In each of the possible $R^1$ or $R^2$ groups, each alkyl group is of a size or molecular weight suitable for use in absorbing sulfur dioxide, preferably in aqueous solutions. Preferably each alkyl aryl, including the substituted groups such as hydroxyalkyl groups, have from 1 to about 12 carbon atoms, more preferably, from 1 to about 6 carbon atoms. Each alkyl group or alkyl portion of an aralkyl group is suitably cyclic, branched or unbranched and optionally is at least partially unsaturated (alkylene), e.g. vinyl or allyl groups or substituents.

In Formula I each alkyl group is unsubstituted or inertly substituted, that is substituted with groups which do not interfere undesirably with use of the compounds to absorb sulfur dioxide, with solubility of the compounds in water or with regeneration of an aqueous solution of the compound after sulfur dioxide is absorbed. The groups preferably also exhibit chemical and thermal stability because the compounds often undergo repeated absorption/regeneration cycles. Exemplary of such inert substituents are hydroxyl groups; carbonyl groups including those in aldelhydes, esters, acids, carboxylates ketones: and sulfoxides.

Preferred substituents, $R^1$ and $R^2$, on compounds of Formula I are those which enhance solubility in water, preferably without decreasing the capacity for absorbing $SO_2$, the regenerability of the compound after absorption, or the chemical and heat stability under conditions of use. Preferred substituents are generally hydrogen, formyl groups, alkyl groups and groups having at least one hydroxyl, or carboxylic acid or salt group, more preferably alkyl groups unsubstituted or having such substituents, most preferably alkyl groups having at least one hydroxyl group, that is hydroxyalkyl groups. When $R^1$ or $R^2$ includes a salt, the salt suitably has any counterion which allows water solubility, preferably such a metal cation, more preferably an alkali metal counterion, or mixtures thereof.

Preferred compounds among compounds of Formula I include piperidines having at least one carbonyl-containing substituent on the ring nitrogen and/or on at least one ring carbon atom: compounds wherein $R^1$ is other than hydrogen, more preferably a carbonyl-containing group, most preferably a formyl or carboxylate group. Formyl groups on nitrogen generally enhance regenerability, while carboxylic acids and salts generally enhance absorption of $SO_2$.

Exemplary of compounds of Formula I are piperidines having carbonyl group such as 1-formyl piperidine: ethyl piperidine-2-carboxylate: ethyl 1-piperidine propionate: 1-piperidine propionic acid: 1-piperidine carboxaldehyde: 4-piperidine carboxaldehyde: and the like. Preferred compounds include 1-formyl piperidine and 1-piperidine propionic acid.

Piperidines having carbonyl-containing substituents on the ring nitrogen are commercially available, and are prepared by methods within the skill in the art, for instance by procedures such as those taught by Jones et al. in *J. Chem. Soc.*, (1952), pp. 3261-3264, teaching the reaction of carbon dioxide and a pyridine to produce formyl piperidines: Hess, et al. in *Chem.* 50, 385-9 (1917) teaching synthesis of 2-piperidene carboxylate by oxidation of picoline with formaldehyde; Treibs, et al. in *Chem. Ber.*, 89, 51–57 (1956) teaching preparation of such compounds as 3-piperidine-propionate and methyl-2-piperidinopropionate by reaction of nitrite and bromo-substituted dicarboxylic acids via oximino and dioximino dicarboxylic acids: Drake, et al. in *J. Amer. Chem. Soc.*, 56, 697-700 (1934) teaching preparation of alkyl-1-piperidinopropionate, e.g. by reaction of certain bromo substituted acrylic esters and piperidine: or Sternberg, et al. in *J. Amer. Chem. Soc.*, 75, 3148-3152 (1953) teaching preparation of N-formyl piperidine by reacting dicobalt octacarbonyl with piperidine in the presence of a Lewis base.

Piperidines having carbonyl-containing substitution on a ring carbon are commercially available and are known in the art. They are prepared by methods within the skill in the art, for instance by procedures such as those taught in U.S. Pat. No. 2,680,116 (Trick, et al.) which teaches treatment of such compounds as dioxodialkyl-piperidines or derivatives thereof with formic acid esters followed by reduction to produce piperidinediones: British patent 742,733 (Roche Products, Ltd.) which teaches reaction of certain dioxodialkyltetrahydropyridines with formaldehyde and reduction to produce certain alkyltetrahydropyridinediones and alkyl-piperidine diones: Shechter, et al. in *J. Amer. Chem. Soc.*, 73, 3087-3091 (1951) teach preparation of certain 2-piperidones by reacting cyclopentanones with hydrazoic acid sulfuric acids. Other methods of preparing 2piperidones are taught by Langley et al. in *J. Amer. Chem. Soc*, 74, 2012-15 (1952) and by Horning, et al.; *Ibid*, pp. 2680-2681.

Among compounds of Formula I, absorbent compounds having high boiling points relative to water are desirable to prevent overhead loss of the absorbent during a thermal regeneration step. The subject compounds possess a much higher boiling point than the trimethyl phosphate employed for that purpose in U.S. Pat. No. 4,320,101.

Among compounds of Formula I, preferred compounds are those which have a capacity for absorbing $SO_2$ which, in combination with the water solubility, is suitable for use in aqueous solutions for absorbing $SO_2$. The capacity for absorbing $SO_2$ is determined by saturating a solution of a known concentration of the absorbent in water with $SO_2$, e.g. by sparging $SO_2$ (preferably in a mixture simulating that found in e.g. smokestacks) into the solution. Sparging is continued until the solution has absorbed a maximum amount of $SO_2$ (saturation). Then the concentration of bisulfite (including sulfite that may be present) and bisulfate (including sulfate) ions are determined, e.g. using a standardized commercially available ion chromatograph unit. Such determinations are within the skill in the art and are exemplified in the Examples of this invention. Capacity is calculated as the mole ratio of absorbed $SO_2$ (as measured by the sum of the moles of bisulfite and bisulfate) to absorbent compound.

The capacity for absorbing $SO_2$ is considered in combination with the water solubility of the compound because the absorbing capacity of a solution is the capacity of the absorbent multiplied by the amount of absorbent present. An arbitrary parameter CS defined as:

$$CS = [Capacity\ in(moles\ SO_2/moles\ absorbent)]X(solubility\ in\ moles\ absorbent/liter\ at\ 23°\ C.)$$

is determined for a potential absorbent. Absorbents used in the practice of the invention preferably have a CS of at least about 0.05, more preferably at least about 0.5, most preferably at least 0.7 moles $SO_2$/liter at 23° C.

The compounds used in the present invention are employed in aqueous solution at a concentration of from about 0.1 weight percent in water up to about their saturation concentration in water at the temperature at which the absorber is operated. The absorbent solution, after use, is preferably thermally regenerated, e.g. by passing steam through the solution, and recycled to the absorption step. The absorber can be operated at a temperature of from about 0° to about 120° C., but is preferably operated at a temperature of from about 5° to about 75° C., most preferably at from about 5° to about 60° C.

Pressures of from about atmospheric to about 10 atmospheres can be employed, but atmospheric pressure (e.g. 0 to 10 pounds per square inch gauge (psig) (0 to 68.95 pascals (Pa) gauge) is preferably and conveniently employed. Higher temperatures and pressures are not deleterious so long as they are below the decomposition conditions of the absorbent, but equipment design modifications may be required to allow for pressure and temperature resistance. Fluids being treated in the practice of this invention suitably contain any amount of $SO_2$, e.g. from about one ppm (parts per million) (by volume) up to about 100 volume percent, preferably from about 100 ppm to about 3000 ppm (by volume). The fluids are suitably in any form suitable for sufficient contact, direct or indirect, with the aqueous solution to permit absorption of $SO_2$. Gas, liquid, suspension and other fluid forms are suitable, but gas form is preferred.

The absorbent compounds are suitably employed using any process within the skill in the art, preferably by contact (direct or indirect) with the fluid containing $SO_2$. Direct contact particularly contact such as flowing the fluid (preferably gas) through the aqueous solution is preferred. Other means of direct contact could include contact of the aqueous solution with $SO_2$-containing liquid (e.g. under pressure), optionally with release of pressure after absorption. Indirect contact, such as through a membrane, is also suitable.

Thermal regeneration of the absorbent suitably takes place at any temperature below the thermal decomposition temperature of the absorbent compound, preferably at a temperature of from about 75° C. to about 150° C., most preferably from about 90° C. to about 120° C., at atmospheric pressure. Reduced pressure or pressures above atmospheric are suitable, but about atmospheric (e g. 0 to 10 pounds per square inch gauge (psig) (0 to 68.95 pascals (Pa) gauge) is convenient. Regeneration at about 100° C. at atmospheric pressure is particularly convenient because water in the aqueous solution boils and can be refluxed while the $SO_2$ is released.

Regenerability of an absorbent is a measure of the ability of the absorbent to release $SO_2$ (so that the absorbent may be reused). Regenerability is determined by measuring the bisulfate and bisulfite concentrations in a solution of known concentration of absorbent which has been saturated with $SO_2$ as in the determination of $SO_2$ absorption capacity. This solution is referred to herein as the enriched solution. Then a portion of the enriched solution is heated to strip $SO_2$ as a gas. For purposes of the measurement, stripping is done at the boiling point of the solution, about 100° C. with $N_2$ sparge at 0.5 SCFH (Standard cubic feet per hour) (equivalent to $3.9 \times 10^{-6}$ m$^3$/s at 16° C.) for 4 hours. During the stripping, additional water is frequently added to make up the water loss due to evaporation. A sample of this stripped solution is analyzed for bisulfite and bisulfate concentration by the same method used to analyze the concentration of the original enriched solution. The difference in combined bisulfite and bisulfate concentrations between the stripped and enriched $SO_2$ solution is used to calculate the percent regenerability of each solution using the equation:

% Regenerability =

$$\left(1 - \frac{\text{Total bisulfite plus bisulfate concentration in stripped solution}}{\text{Total bisulfite plus bisulfate concentration in enriched solution}}\right) \times 100$$

Percent regenerability of absorbents used in the practice of the invention is preferably at least about 30, more preferably at least about 50, most preferably at least about 60 percent.

The following examples illustrate the use of the absorbent compounds in the process of the invention. All parts, ratios and percentages are by weight unless otherwise indicated.

enriched solution. A small sample of the $SO_2$ enriched solution is analyzed for bisulfite [$HSO_3^-$] and bisulfate [$HSO_4^-$] concentration using a standardized ion chromatograph commercially available from Dionex Corporation under the trade designation Dionex TM IC Series 4000, having a column packed with AG4/AS4 resin also commercially available from Dionex Corporation, a conductivity detector commercially available from Wescant Corp. and a Dionex anion micro membrane suppressor commercially available from Dionex Corp. under the trade designation 8080.

The sum of the bisulfite and bisulfate concentrations is used to calculate the $SO_2$ capacity (mole ratio of $SO_2$/absorbent compound) as indicated in the Table.

Then, the remaining $SO_2$ enriched solution is transferred into a flask and heated to boil on a hot plate at about 100° C. with $N_2$ sparge (0.5 SCFH) ($3.9 \times 10^{-6}$ m$^3$/s at 16° C.) for 4 hours to strip $SO_2$ as a gas. During the stripping, additional water is frequently added to make up the water loss due to evaporation. A sample of this stripped solution is analyzed for bisulfite and bisulfate concentration by the same method used to analyze the concentration of the original enriched solution. The difference in combined bisulfite and bisulfate concentration between the stripped and original (enriched) $SO_2$ solution is used to calculate the $SO_2$ percent regenerability of each solution using the equation:

% Regenerability =

$$\left(1 - \frac{\text{Total bisulfite plus bisulfate concentration in stripped solution}}{\text{Total bisulfite plus bisulfate concentration in enriched solution}}\right) \times 100$$

The CS, calculated by multiplying the capacity times the solubility in moles/l, is included in Table 1. The compounds used in Examples 1, 2 and 4 are used in concentrations less that saturation; therefore the CS reported in the table is based on concentration in place of solubility.

TABLE I

| Ex. No. | Compound | grams of compound | moles of compound | moles $SO_2$ in enriched solution | $SO_2$ capacity | Moles $SO_2$ in stripped solution | $SO_2$ regenerability % | CS* in Moles $SO_2$/liter |
|---|---|---|---|---|---|---|---|---|
| 1 | Ethyl piperidine 2-carboxylate | 9.93 | 0.0632 | 0.0527 | 0.83 | 0.0372 | 64 | 0.75 |
| 2 | 1-Formyl piperidine | 21.4 | 0.1872 | 0.0711 | 0.38 | 0.0112 | 84 | 1.02 |
| 3 | Ethyl 1-piperidine propionate | 19.5 | 0.1050 | 0.0403 | 0.38 | 0.0072 | 82 | 0.57 |
| 4 | 1-piperidine propionic acid | 19.5 | 0.1239 | 0.1049 | 0.85 | 0.0198 | 81 | 1.50 |

*Only the compound used in Example 3 is used at maximum solubility, others are used less than saturation, and would have a CS greater than the value indicated which is based on concentration.

EXAMPLES 1-4

For each of the absorbent compounds listed in Table 1, the amount of compound indicated in the Table is placed into a graduate cylinder and deionized water is added to bring the total volume to 70 ml (milliliters) at room temperature (23° C.) to form a solution A 5/95 volume percent mixture of $SO_2$ and $N_2$ (respectively) gases is sparged through a coarse (100-150 micron) gas dispersion tube into the solution at 2.0 standard cubic feet per hour, meaning cubic feet at 60° F. at atmospheric pressure passed per hour (SCFH) (equivalent to $3.9 \times 10^{-5}$ m$^3$/s at 16° C.) for 4 hours to form a $SO_2$ The data in Table 1 show that absorbents preferred for use in the practice of this invention have CS values within the preferred range.

What is claimed is:

1. A process for removing $SO_2$ from a fluid containing $SO_2$ comprising contacting the fluid with a composition consisting essentially of an aqueous solution of at least one compound represented by Formula I:

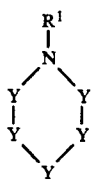

Formula I wherein each Y is independently —$(CR^2_2)$— or —$(CR^2)$= and each $R^1$ or $R^2$ is independently hydrogen, an alkyl group; an hydroxyalkyl group; an aldehyde group; a carboxylic acid group or salt thereof; an alkyl group containing at least one carboxylic ester, a carboxylic acid or salt thereof, ether, aldehyde, ketone, or sulfoxide group; wherein the compound has at least one carbonyl group such that the composition acts as an absorbent for $SO_2$.

2. The process of claim 1 wherein at least one $R^1$ or $R^2$ comprises an aldehyde, ester, carboxylic acid or salt, or ketone.

3. The process of claim 1 wherein, in addition to the carbonyl group, at least one of $R^1$ or $R^2$ is selected from the group consisting of alkyl groups, formyl groups and groups having at least one hydroxyl group, carboxylic acid or salt group, and wherein each alkyl group has from 1 to about 6 carbon atoms.

4. The process of claim 1 wherein at least one compound is a piperidine having at least one carbonyl-containing group on the ring nitrogen.

5. The process of claim 4 wherein at least one of $R^1$ or $R^2$ is an alkyl group which is unsubstituted or has at least one hydroxyl, carboxylic acid or salt substituent.

6. The process of claim 5 wherein $R^2$ is an aldehyde-, ester-, carboxylic acid- or salt- containing group.

7. The process of claim 6 wherein $R^1$ is selected from the group consisting of alkyl groups and alkyl groups having at least one hydroxyl, carboxylic acid or salt group: and each alkyl group has from 1 to about 6 carbon atoms.

8. The process of claim 4 wherein $R^1$ is a carbonyl-containing group.

9. The process of claim 1 wherein at least one compound is selected from the group consisting of ethyl piperidine-2-carboxylate: ethyl 1-piperidine propionate: 1-piperidine propionic acid: 1-piperidine carboxaldehyde: 4-piperidine carboxaldehyde.

10. The process of claim 9 wherein at least one compound is 1-formyl piperidine or 1-piperidine propionic acid.

11. The process of claim 1 wherein at least one compound is a piperidine having carbonyl-containing substitution on a ring carbon atom.

12. The process of claim 8 wherein at least one $R^2$ is selected from the group consisting of alkyl groups and alkyl groups having at least one hydroxyl, carboxylic acid or salt groups, and each alkyl group has from 1 to about 6 carbon atoms.

13. The process of claim 12 wherein $R^2$ is an aldehyde-, ester-, carboxylic acid- or salt- containing group.

14. The process of claim 1 wherein the aqueous solution contains a concentration of the absorbent compound of at least 0.1 weight percent.

15. The process of claim 1 wherein absorption of the $SO_2$ from the fluid is conducted at a temperature of from 0° C. to about 120° C.

16. The process of claim 15 wherein the absorption of the $SO_2$ from the fluid is conducted at a temperature of from about 5° C. to about 60° C.

17. The process of claim 1 wherein the absorbent has a percent regenerability of at least about 30 percent.

18. The process of claim 17 wherein the absorbent has a CS of at least about 0.05.

19. The process of claim 18 wherein the absorbent has a CS of at least about 0.5.

20. The process of claim 1 wherein fluid has an $SO_2$ concentration of from 1 ppm by volume up to about 100 volume percent of the fluid.

21. The process of claim 20 wherein the $SO_2$ concentration is from about 100 ppm to about 3000 ppm of the fluid.

22. The process of claim 1 wherein after absorption of $SO_2$ by the aqueous solution, in a thermal regenerating step, $SO_2$ is removed from the aqueous solution.

23. The process of claim 22 wherein in the thermal regenerating step, $SO_2$ is removed from the aqueous solution by heating the solution to a temperature of from about 75° C. to about 150° C.

24. The process of claim 23 wherein the temperature is from about 90° C. to about 120° C.

25. The process of claim 23 wherein, in addition to the carbonyl group, at least one of $R^1$ or $R^2$ is selected from the group consisting of alkyl groups, formyl groups and groups having at least one hydroxyl group, carboxylic acid or salt group, and wherein each alkyl group has from 1 to about 6 carbon atoms.

26. The process of claim 23 wherein at least one compound is a piperidine having at least one carbonyl-containing group on the ring nitrogen.

27. The process of claim 26 wherein $R^1$ is a carbonyl-containing group.

28. The process of claim 22 wherein at least one of $R^1$ or $R^2$ is an alkyl group which is unsubstituted or has at least one hydroxyl, carboxylic acid or salt substitutent.

29. The process of claim 28 wherein $R^2$ is an aldehyde-, ester-, carboxylic acid- or salt- containing group.

30. The process of claim 29 wherein $R^1$ is selected from the group consisting of alkyl groups and alkyl groups having at least one hydroxyl, carboxylic acid or salt group; and each alkyl group has from 1 to about 6 carbon atoms.

* * * * *